United States Patent Office 3,375,514
Patented Mar. 26, 1968

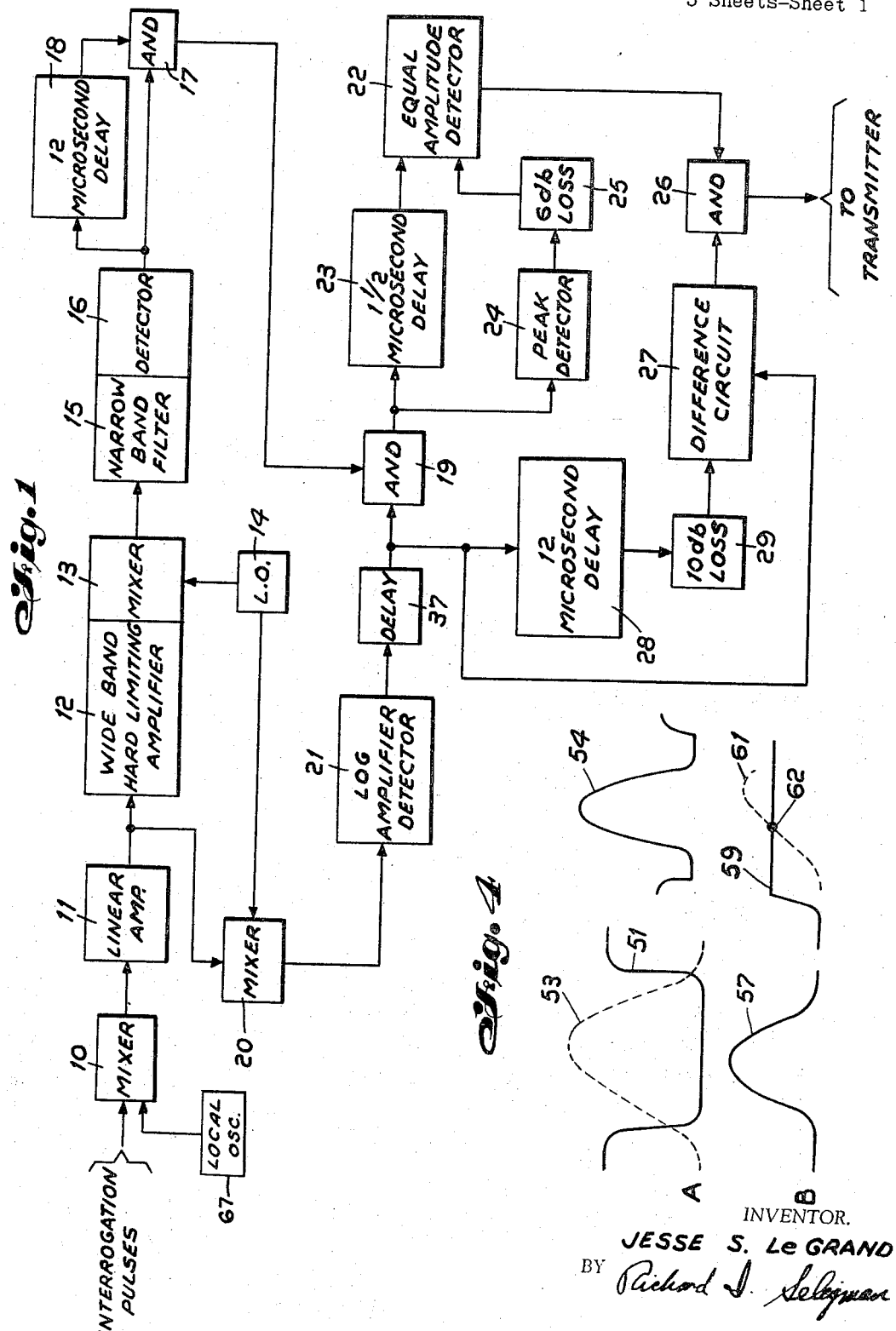

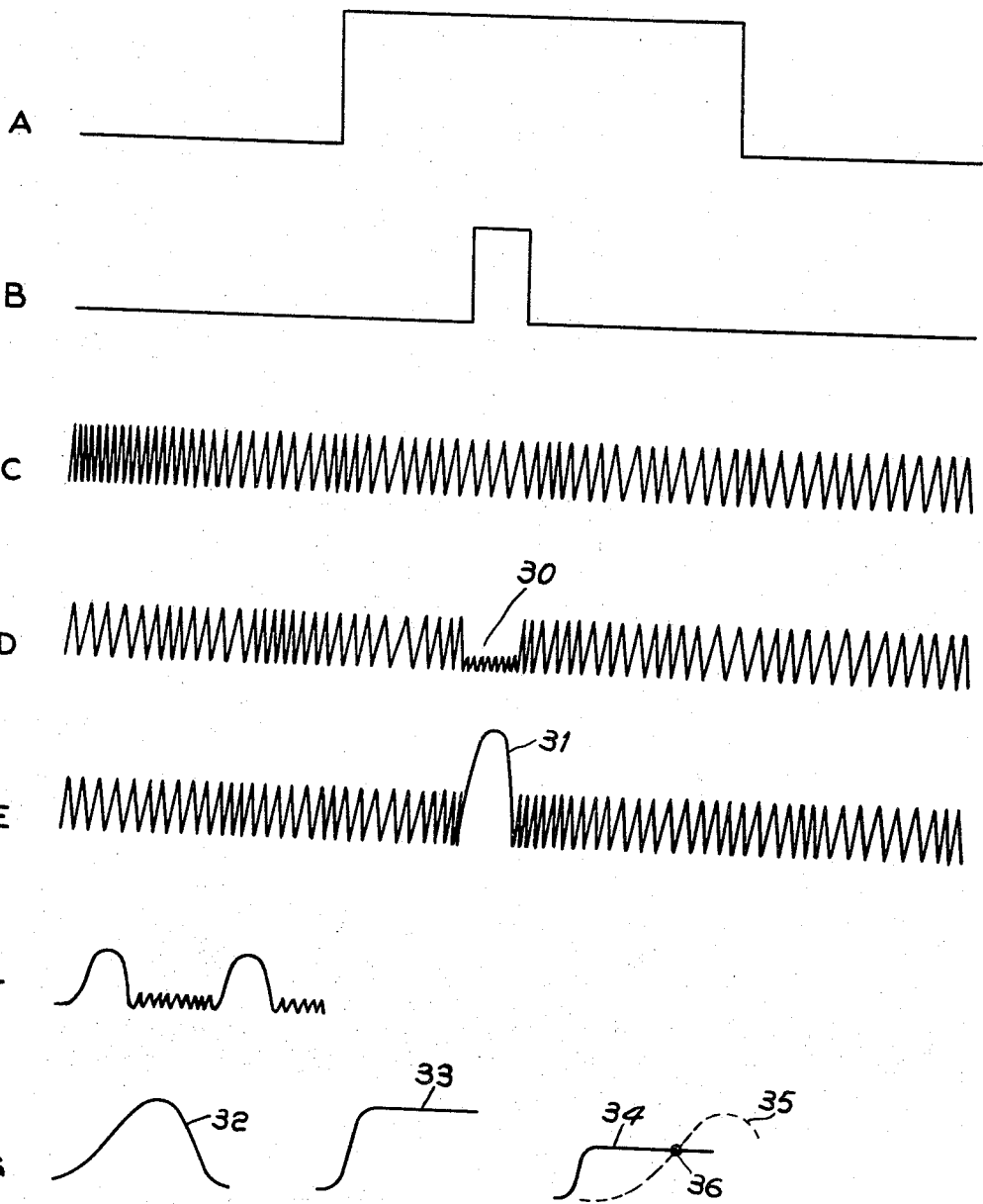

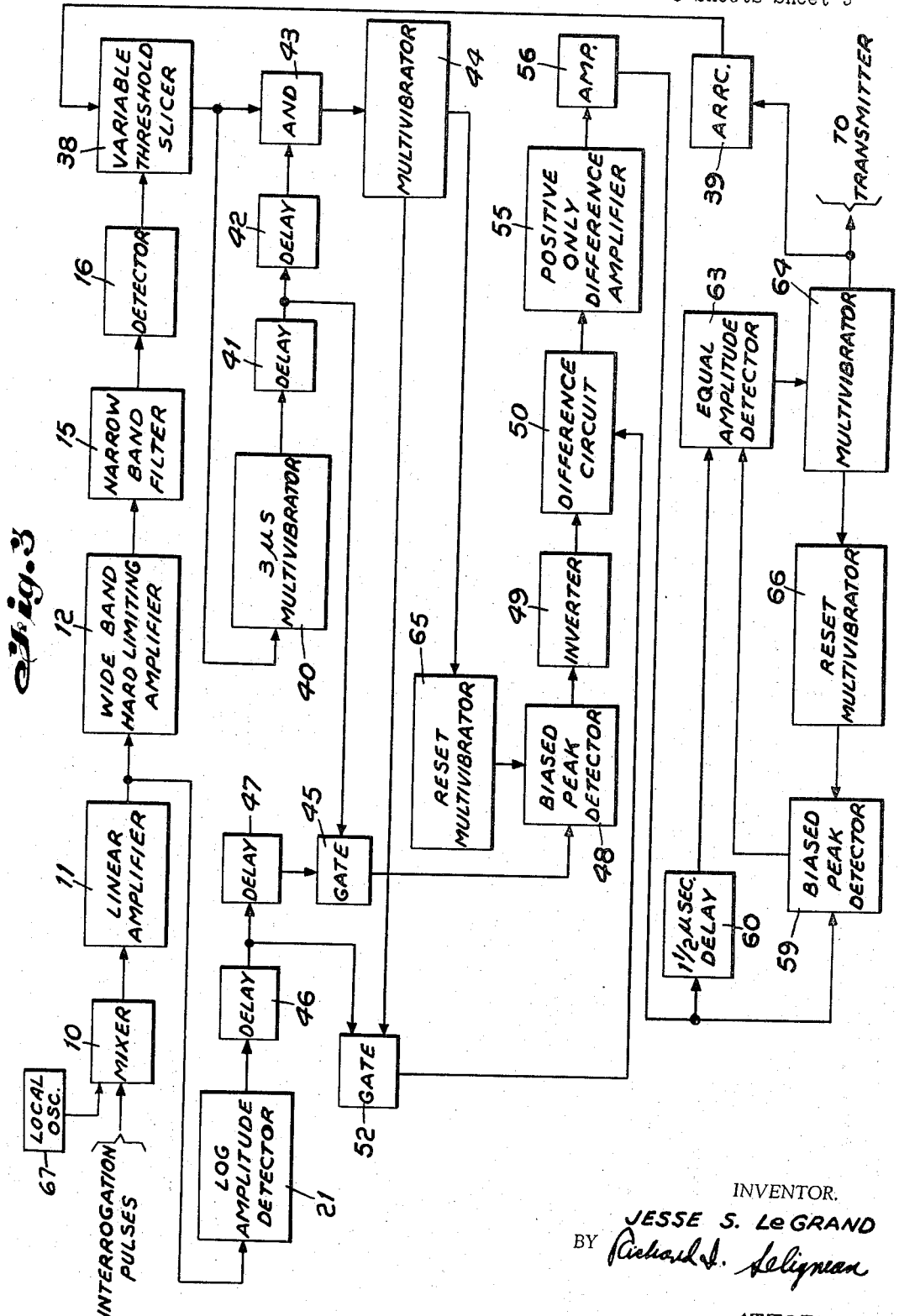

3,375,514
RECEIVING STATION FOR RADIO NAVIGATION SYSTEM
Jesse S. Le Grand, Clifton, N.J., assignor to International Telephone and Telegraph Corporation, Nutley, N.J., a corporation of Maryland
Filed Feb. 23, 1966, Ser. No. 529,462
10 Claims. (Cl. 343—6.5)

ABSTRACT OF THE DISCLOSURE

A receiver station for a radio navigation system such as TACAN having means for adjacent channel rejection, echo suppression and precision half-amplitude finding of an incoming pulse signal.

---

This invention relates to a station for a radio navigation system and more particularly to a radio receiver having means for adjacent channel rejection, echo suppression, and precision half-amplitude finding of an incoming pulse signal.

In radio navigation systems employing a multiplicity of channels it is a requisite that rejection of adjacent channel splatter be accomplished in order that a receiver not respond to off-channel signals. In the radio navigation system, commonly known as TACAN, the ground station receiver heretofore employed a so called Ferris circuit to accomplish adjacent channel spatter rejection. The Ferris circuit or Ferris discriminator is difficult to align, especially by relatively unskilled personnel.

To accomplish precision distance measuring it is necessary that some portion of the received DME (distance measuring equipment) interrogation pulse be precisely selected and defined in order to give some precise point from which to measure, for example the half-amplitude of the rise portion of the second pulse in a pulse pair. In the TACAN system a ground station receiver is interrogated by pulse pairs, the pulses of a pair being separated by 12 microseconds in one mode of operation. In response to received pulse pairs a ground station transmitter is caused to be triggered and to transmit other pairs, the distance measuring being accomplished by metering the time lapse between the interrogation and response signals plus any fixed delay inherent in the equipment.

Heretofore an instantaneous AGC was employed to limit the amplitude of the second pulse of a pulse pair to a desirable value when the first pulse of the pair was very strong.

Since pulse pairs are the employed signals it is necessary to distinguish between a true pulse pair signal and an incoming signal which is composed of a first pulse plus a second pulse which is an echo of the first pulse and spaced therefrom by twelve microseconds.

Accordingly, it is an object of this invention to provide an improved radio receiver for distance measuring equipment.

Another object of this invention is to provide a ground station receiver having improved off-channel rejection capability.

A further object of this invention is to provide a ground station receiver for distance measuring which includes precision half-amplitude determination, and elimination of instantaneous AGC requirements.

In accordance with one aspect of the present invention there is provided apparatus for receiving DME interrogation pulses, for rejecting off-channel received pulses using a wide-band hard limiting amplifier followed by a narrow-band filter, and for finding the half-amplitude of only the on-channel received pulses by comparing the amplitude of the pulses of a received pair after one of the pulses has been decreased in amplitude by fifty percent.

A feature of the invention is a provision for echo suppression which is accomplished by compressing the first pulse of a pulse pair and applying the first and second pulses to a difference circuit, the output thereof being employed to enable further use of the pair only if the output exceeds a predetermined magnitude.

The above-mentioned and other features and objects of this invention will become more apparent by reference to the following description taken in conjunction with the accompanying drawings, in which:

FIGURE 1 is block diagram illustrating in part one embodiment of a ground station receiver in accordance with the invention;

FIGURE 2 is a series of waveforms illustrating the operation of the ground station receiver of FIGURE 1;

FIGURE 3 is a block diagram illustrating in part a second and preferred embodiment of a ground station receiver in accordance with the invention; and FIGURE 4 is a series of waveforms illustrating the operation of the embodiment of FIGURE 3.

In the hereinafter described embodiments of the present invention, I prefer to employ a wide-band hard limiting amplifier followed by a narrow-band filter as a means for discriminating between on and off-channel signals, and to decode the output from the aforementioned narrow-band filter to enable a gate at which further operations on the received signals are preformed, particularly making a determination of the half-amplitude point of the second pulse of a pulse pair.

FIGURE 1 illustrates a first embodiment of a receiver in accordance with the present invention, the receiver comprising a mixer 10 to which the received interrogation pulses are applied, the output therefrom being applied to a gain controlled linear amplifier 11. A local oscillator 67 is coupled to the other input of mixer 10. Linear amplifier 11 can be a conventional low-noise amplifier followed by a stage(s) that can be gain controlled. The output of linear amplifier 11 is coupled to a wide-band hard limiting amplifier 12. The output from wide-band hard limiting amplifier 12 is fed via a mixer 13, which has a second input thereto, an output from another local oscillator 14, to a narrow-band filter 15. When linear amplifier 11 is running at full gain wide-band hard limiting amplifier 12 will be hard limiting on thermal noise. Thus, the power input of the narrow-band filter will be constant.

The output from narrow-band filter 15 after detection by a detector 16 is applied to an AND gate 17 both directly and through a 12 microsecond delay 18 (it should be noted that the pulses employed in the TACAN system are pairs, each pair being spaced by 12 microseconds); hence, when a pulse pair separated by 12 microseconds is received it is decoded by AND gate 17, the output from which enables a second AND gate 19.

A second output from linear amplifier 11 is applied to a mixer 20 the output therefrom being fed to a log amplifier detector 21 whose output passes through AND gate 19 via a delay 37 (which is provided to obtain proper time relationship between the various operations) when AND gate 19 has been enabled by an output from AND gate 17. Mixer 20 has a second input thereto from local oscillator 14. The output from AND gate 19 is applied to an equal amplitude detector 22 via a 1½ microsecond delay 23 and simultaneously applied to a peak detector 24. The output from detector 24 is decreased by a 6 db loss circuit 25, with the resultant output also being applied to equal amplitude detector 22. The output of equal amplitude detector 22 is applied to an AND gate 26.

A second output from log amplifier detector 21 is applied via delay network 37 directly to a difference circuit 27 while simultaneously being applied to the difference circuit via a 12 microsecond delay 28 and a 10 db loss circuit 29. The output from difference circuit 27 is fed as a second input to AND gate 26, with an output from AND gate 26 being the requisite transmitter trigger.

Operation of the embodiment of FIGURE 1 is described below with the aid of the waveforms of FIGURE 2. Waveforms A and B of FIGURE 2 illustrate the frequency bandwidth of wide-band hard limiting amplifier 12 and the frequency bandwidth of narrow-band filter 15 respectively. In the TACAN system the bandwidth of limiting amplifier 12 is approximately 5 megacycles, which is conveniently obtained at a mid-frequency of 6.3 megacycles and the response shape is approximately gaussian (it being shown as rectangular for explanation purposes only). Narrow-band filter 15 has a bandwidth of approximately 500 kc. at a mid-frequency of approximately 6 megacycles. Since wide-band hard limiting amplifier 12 is adjusted to be hard limiting on thermal noise, when no signal is received the output from narrow-band filter 15 will appear as shown in FIGURE 2C. It must be remembered that the power input to narrow-band filter 15 is always *constant* because of the characteristics of amplifier 12.

When an off-channel signal is received, the output from narrow-band filter 15 will appear as shown in FIGURE 2D; a hole 30 is shown "punched" in the signal. Since only constant power is available out of the limiter, if the off-channel signal is of a much greater value than the thermal noise, it utilizes most of the power, and thus the noise is reduced to take up the remaining available constant power out. In contrast when an on-channel signal is received as shown in FIGURE 2E, a pulse 31 is clearly indicated. It is this pulse and a similar one formed by the second pulse of the TACAN pulse pair received which causes AND gate 17 to enable AND gate 19. Thus, when a proper on-channel TACAN pulse pair is received, the output from narrow-band filter 15 will appear substantially as shown in FIGURE 2F.

An output from linear amplifier 11 after a frequency conversion in mixer 20, which has as a second input thereto an output from local oscillator 14, is applied to log amplifier detector 21, the output therefrom being shown in FIGURE 2G as a pulse 32. Upon a proper decode by AND gate 17 pulse 32 is permitted to pass through AND gate 19. The pulse is detected at peak detector 24, the resultant waveform now appearing as a pulse 33 in FIGURE 2G. After subtraction of a constant voltage at 6 db loss circuit 25 the resultant waveform now appears as a pulse 34 in FIGURE 2G. Instead of providing 6 db loss circuit 25 the same results can be obtained by reverse biasing peak detector 24. Waveform 34 is applied to one input of equal amplitude detector 22. Pulse 32 is also applied to a second input of equal amplitude detector 22 via 1½ microsecond delay 23. This pulse is represented by a dotted waveform 35 in FIGURE 2G. The point 36 where pulse 35 crosses the peak amplitude of pulse 34 is the point at which the ground station transmitter should be triggered, that is, the half-amplitude point of the TACAN pulse, and it is this trigger that passes through AND gate 26 if AND gate 26 has been enabled by an output from difference circuit 27.

Difference circuit 27 will only enable AND gate 26 when the second pulse from a pulse pair has an amplitude which is not less than 10 db below the amplitude of the first pulse of said pulse pair. This determination is made by applying the output from log amplifier detector 21 to a delay element 37 and then to a 12 microsecond delay 28 which is followed by 10 db loss circuit 29, at which a fixed voltage is subtracted from the output of delay element 28. The output of 10 db loss circuit 29 is applied to one input of difference circuit 27 and the output of delay element 37 is directly applied to another input of difference circuit 27. Difference circuit 27 will not produce an output if the second received pulse of said pulse pair is more than 10 db less than the first received pulse of said pulse pair. That is, if the output pulse from the 10 db loss circuit 29 is greater than the direct output of delay element 37, the difference circuit 27 will not produce a proper output to enable AND gate 27. This feature provides echo suppression. The 10 db value is only one of engineering choice.

The difference circuit 27 may be any one of many well known circuits for producing the above-described results. For example, difference circuit 27 may comprise a differential amplifier of well known conventional design. The output of the differential amplifier which is utilized in this application is the one which provides the proper polarity to operate AND gate 26 when the direct output of delay element 37 exceeds the output provided by the 10 db loss circuit 24. This type of circuit is well known in the art and a more detailed description thereof is deemed unnecessary for a proper understanding of the instant invention.

FIGURE 3 illustrates a second and preferred embodiment in accordance with the invention. The ground station receiver of FIGURE 3 comprises in part a mixer 10 to which the received interrogation pulses are applied, the output therefrom being applied to a linear amplifier 11. A local oscillator 67 is coupled to the other input of mixer 10. The output from linear amplifier 11 is applied to a wide-band hard limiting amplifier 12, with the output therefrom coupled to a narrow-band filter 15 and a detector 16. The output from detector 16 is fed to a variable threshold slicer 38 which has as a second input thereto an output from an automatic repetition rate control, ARRC, circuit 39 whose input is taken at the input to the transmitter. The output from variable threshold slicer 38 is applied to two inputs of an AND gate 43, one input directly and a second input via a three microsecond multivibrator 40 and delays 41 and 42.

The output from AND gate 43 is coupled to a monostable multivibrator 44, an output is coupled to a gate 52. The output of which from linear amplifier 11 is also applied to a log amplifier detector 21 with the output therefrom applied as a second input to gate 52 via a delay 46. The output from variable threshold slicer 38 after delay by network 41 is coupled to a gate 45 which has as a second input thereto the output from log amplifier detector 21 after passing through delay 46 and another delay 47.

The output from gate 45 is coupled to a biased peak detector 48 the output therefrom being applied as one input to a difference circuit 50 via an inverter 49, the second input to the difference circuit 50 being the output from gate 52. The output from difference circuit 50 is coupled to a positive polarity only amplifier 55, the output therefrom being amplified by an amplifier 56. The output from amplifier 56 is applied in two paths to an equal amplitude detector 63, via 1½ microsecond delay 60, and also via a biased peak detector 58. An output from equal amplitude detector 63 is coupled to a multivibrator 64 whose output enables the trigger to the ground station transmitter.

Operation of the embodiment of FIGURE 3 is described below with reference to FIGURE 4. Adjacent channel splatter rejection is accomplished in the same manner as described hereinbefore with respect to the embodiment of FIGURE 1 using linear amplifier 11, wideband hard limiting amplifier 12, and narrow-band filter 15.

The resultant narrow-band signal is detected at detector 16 and fed to variable threshold slicer 38 which is employed to insure that a constant 2700 pulses per second are fed out from the receiver, a TACAN requirement. Variable threshold slicer 38 provides an output pulse when an input pulse thereto exceeds a predetermined value. Note that these 2700 pulses per second need not be symmetrically spaced. The variable threshold slicer is biased such that if enough interrogations are not coming in (that is less than 2700 per second) then noise inputs are used to make up the deficiency; this is accomplished by biasing the threshold slicer accordingly. The variable threshold slicer circuit utilizes the output of ARRC circuit 39 (which output is a function of the total number of receiver output pulses per second) to control the receiver triggering level (i.e., the threshold level of variable threshold slicer 38) and thus the receiver output pulse count. The variable threshold slicer admits sufficient noise pulses along with received interrogation pulses so that the total number of transmitter pulses per second is maintained at a constant value.

The output from variable threshold slicer 38 is then operated upon to produce timing gates and reset pulses for the receiver timing circuits in response to properly coded interrogation pulse pairs. Isolated single pulses or incorrectly coded pulse pairs are rejected. The resulting timing gates and reset pulses are employed by the receiver timing circuits to assist in selecting the 6 db down point on the log output waveform (to be explained hereinafter). The 6 db down point serves as a reference in developing the receiver output which controls the trigger of the output, as explained hereinbefore with respect to the embodiment of FIGURE 1.

The output pulses from variable threshold slicer 38 are applied to AND gate 43 directly and via monostable multivibrator 40 and delays 41 and 42 which in this exemplary embodiment are each of 6 microseconds duration. A proper decode of a pulse pair is signified by the triggering of monostable multivibrator 44. One significant difference of this embodiment over that of the embodiment of FIGURE 1 is that both the first and second pulses of the pulse pair are employed for purposes other than only the initial decoding. The pulse from monostable multivibrator 40 is applied after delay by network 41 to enable gate 45 such that the first pulse from a pulse pair, after operation on log amplifier detector 21 and delay at networks 46 and 47 is passed to biased peak detector 48 and inverter 49, with the output therefrom being applied to difference circuit 50. This input to difference circuit 50 is shown by pulse 51 in FIGURE 4A. The second pulse of the pulse pair passing through log amplifier detector 21 passes through gate 52, via delay 46, if a TACAN decode has occurred and is also applied to difference circuit 50. This pulse is represented by pulse 53 in waveform 4A. The output from circuit 50 is now the difference between pulses 51 and 53 as shown by pulse 54 of FIGURE 4A. The positive portion of pulse 54 is amplified at 55 and 56 and is represented by the pulse 57 of FIGURE 4B. Pulse 57 is biased peak detected at 58 to produce an output 59 as shown in FIGURE 4B. The output from amplifier 56 is also applied to 1½ microsecond delay 60, the output from this delay being represented by pulse 61. When pulse 61 crosses the peak of pulse 59 at 62 equal amplitude detector 63 triggers multivibrator 64, the output therefrom being the requisite transmitter trigger. Resets for peak detectors 48 and 58 by multivibrators 65 and 66 respectively are derived from the fall portion of the pulses from multivibrators 44 and 64 respectively.

Additional echo suppression circuitry is not required for this embodiment because it automatically occurs as a by-product thereof. The method represented by the embodiment of FIGURE 3 has the advantage that the 6 db point is not at or near the top of the pulse and therefore it is much easier to make accurate measurements since a greater amplitude of voltage is available.

While I have described the above principles of my invention in connection with the specific apparatus, it is to be clearly understood that the specification is presented by way of example only and not as a limitation of the scope of my invention, as set forth in the accompanying claims.

I claim:

1. A radio receiver for responding to on-frequency signals and for discriminating against off-frequency signals comprising:
    means for receiving said signals;
    a wide-band hard limiting amplifier which is hard limiting on thermal noise, the input of said amplifier being coupled to the output of said receiving means; and
    a narrow-band filter, the input thereof being coupled to the output of said wide band amplifier, the output of said narrow-band filter being coupled to the output of said receiver.

2. In a radio navigation system, a station for receiving signals consisting of pulse pairs and for responding thereto, comprising:
    means for receiving said pulse pairs; and
    means coupled to said receiving means for providing echo suppression, said echo suppression means including:
        a delay means coupled to the output of said receiving means;
        means coupled to the output of said delay means for attenuating the output signal from said delay means;
        a different circuit, one input thereof being coupled to the output of said attenuating means and the other input thereof being coupled directly to the output of said receiving means, said difference circuit producing an output signal when one input signal thereto exceeds the other input signal thereto; and
        means coupled to the output of said difference circuit for precluding said station from responding to said pulse pairs when said difference circuit does not provide said output signal.

3. In a radio navigation system, a station for receiving signals consisting of pulse pairs and for responding thereto, comprising:
    means for receiving said signals; and
    means coupled to said receiving means for providing a reference signal at a predetermined point on the rising portion of the second pulse of said pulse pair, including:
        an equal amplitude detector having an output and first and second inputs;
        delay means coupling the output of said receiving means to said first input of said equal amplitude detector;
        a peak detector coupled to the output of said receiving means;
        attenuation means coupling the ouput of said peak detector to said second input of said equal amplitude detector; and
        means coupling the output of said equal amplitude detector to the output of said station.

4. A station receiver as in claim 3 in which said attenuation means includes means for biasing said peak detector.

5. A station receiver as in claim 3, further including a log amplifier detector coupling said receiving means to said delay means and to said peak detector.

6. A station as in claim 3, further including means for preventing an output from said station when the pulses of a received pulse pair do not have a predetermined time characteristic, including an AND gate having an output and first and second inputs, said first input being coupled to said receiving means, and delay means coupling said receiving means to said second input of said AND gate, whereby simultaneous signals at said first and second inputs to said AND gate cause a signal to be generated at the output of said AND gate to signify a proper pulse pair.

7. In a radio navigation system, a station for receiving signals consisting of pulse pairs and for responding thereto, comprising:
    means for receiving said signals; and
    means coupled to said receiving means for providing a reference signal at a predetermined point on the rising portion of the second pulse of said pulse pair, including:
- a first biased peak detector coupled to the output of said receiving means;
- a difference circuit having an output and first and second inputs, said first input being coupled to the output of said first biased peak detector and said second input being coupled to the output of said receiving means;
- an equal amplitude detector having an output and first and second inputs;
- delay means coupling the output of said difference circuit to the first input of said equal amplitude detector;
- a second biased peak detector coupling the output of said difference circuit to the input of said equal amplitude detector; and
- means coupling the output of said equal amplitude detector to the output of said station.

8. A station as in claim 7, further including a log amplifier detector coupling said receiving means to said first biased peak detector and to said second input of said difference circuit.

9. A station as in claim 8, further including an inverter coupling the output of said first biased peak detector to said first input of said difference circuit.

10. A station as in claim 9, further including a positive only amplifier coupling the output of said difference circuit to the inputs of said delay means and said second biased peak detector.

References Cited

UNITED STATES PATENTS

| | | | |
|---|---|---|---|
| 3,007,156 | 10/1961 | Barber | 343—6.5 X |
| 3,032,757 | 5/1962 | Majerus et al. | 343—6.8 |
| 3,155,966 | 11/1964 | Allen | 343—6.5 X |
| 3,178,705 | 4/1965 | Clock et al. | 343—6.8 |
| 3,178,706 | 4/1965 | Clock | 343—6.8 |
| 3,119,998 | 1/1964 | Foley | 343—17.5 XR |
| 3,331,068 | 7/1967 | Busignies | 343—6.5 XR |

RODNEY D. BENNETT, *Primary Examiner.*

RICHARD A. FARLEY, *Examiner.*

M. F. HUBLER, *Assistant Examiner.*